Aug. 21, 1951
E. A. BINNEY ET AL
2,565,118
ELECTRIC MOTOR CONTROL SYSTEM
Filed March 11, 1950
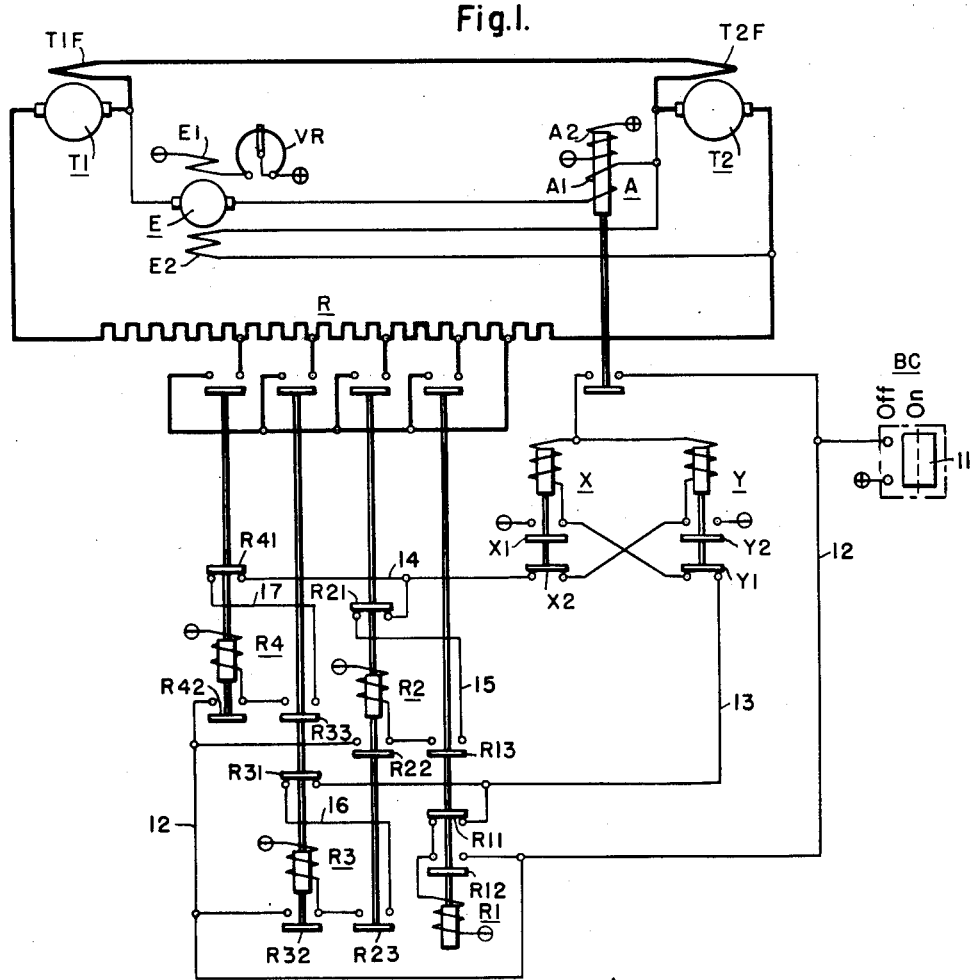
Fig.1.
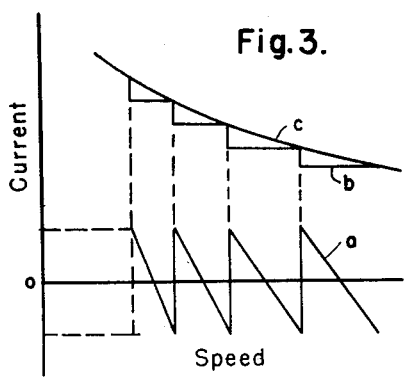
Fig.2.
| Braking Sequence Switches | | | | | | | | |
|---|---|---|---|---|---|---|---|---|
| Polarity of Exciter E. | | A | X | Y | R1 | R2 | R3 | R4 |
| | + | O | O | | O | | | |
| | − | | | | O | | | |
| | + | O | | | O | O | | |
| | − | | | | O | O | | |
| | + | O | O | | O | O | O | |
| | − | | | | O | O | O | |
| | + | O | | | O | O | O | O |
| | − | | | | O | O | O | O |
Fig.3.
WITNESSES:
E.A.McCloskey
Nw.C.Groome
INVENTORS
Eric A. Binney and
Frederick W. Roberts.
BY
ATTORNEY Patented Aug. 21, 1951

2,565,118

UNITED STATES PATENT OFFICE 2,565,118

ELECTRIC MOTOR CONTROL SYSTEM

Eric Alton Binney, Ilkley, and Frederick Walter Roberts, Bradford, England, assignors to The English Electric Company Limited, London, England, a British company Application March 11, 1950, Serial No. 149,092
In Great Britain April 4, 1949

10 Claims. (Cl. 318—381)

Our invention relates, generally, to electric motor control systems, and more particularly to rheostatic or dynamic braking systems for direct-current traction motors of the series type.

It is known that the correct commutation conditions are maintained during the speed variation incident to a normal braking operation when the armature current is allowed to increase inversely as the speed of the armature decreases, the current-speed characteristic thus following substantially the line of a hyperbola. Thus, under the assumption of a constant generated voltage, the value of which depends upon the design of the machine, the optimum braking effort, as limited by the current, is obtained by so controlling the motor field and the braking resistance that the current varies in accordance with the law established.

It is obvious that the ideal condition cited above would require an infinitely variable resistance which is not always practicable, especially when a large amount of power is involved. In the present instance, the resistance change is assumed to be effected in the conventional manner by short circuiting sections of the resistance bank connected across the motor armatures.

An object of the invention is to provide a rheostatic or dynamic braking system in which the current supplied by the motor is automatically varied in accordance with the permissible value of current for any given speed which will maintain the correct commutation conditions during the braking period.

According to one feature of the invention, the motor field strength is automatically controlled to obtain a constant armature voltage with varying speed by exciting the motor field from an amplifying exciter having a control winding excited in accordance with the armature current or voltage and a reference winding supplied from an adjustable voltage source. The amplifying exciter may be of any known kind such as, for example, that described in United States Letters Patent No. 2,474,648, issued June 28, 1949 to E. A. Binney and assigned to the assignee of this application.

In one arrangement according to the invention, the braking resistance across the armature is reduced in stages corresponding to a number of speeds, the total resistance being chosen for the voltage and current values corresponding to the maximum speed at which braking will occur. As the speed drops, the voltage is maintained at the initial value and the current is, therefore, also substantially constant. It, therefore, deviates the more from the optimum current value the lower the speed. At a chosen lower speed, the first reduction in resistance is effected. The remaining resistance is of such a value that with the voltage generated at that moment the new value of braking current will correspond to the optimum value for the speed obtaining at the moment the change in resistance is made. From this it will be obvious that the actual braking curve has a stepped character, the top "riser" points lying on the optimum curve, while the continuation is horizontal between each notching speed.

For a better understanding of the nature and objects of the invention, reference may be had to the following detailed description, taken in conjunction with the accompanying drawing, in which:

Figure 1 is a diagrammatic view of a control system embodying the principal features of the invention;

Fig. 2 is a chart showing the sequence of operation of the apparatus illustrated in Fig. 1, and Fig. 3 is a view of curves for the traction motors and the amplifying exciter during dynamic braking.

Referring to the drawing, and particularly to Fig. 1, the system shown therein comprises traction motors T1 and T2 having series field windings T1F and T2F, respectively, which are connected in series-circuit relation with the armature windings of the motors and in series with a dynamic braking resistor R. An amplifying exciter E is connected in parallel-circuit relation with the field windings of the motors in such a manner that the armature of the exciter will act either as a boosting or as a by-passing means, according to whether the braking current is less than or greater than that required in the traction motor fields for the purpose of excitation.

The exciter E is provided with a reference field winding E1 which may be energized from a substantially constant source of excitation such as a battery. A variable rheostat VR may be utilized to adjust the current in the field winding E1. The exciter E is also provided with a control field winding E2 which may be connected across the armature of the motor T2, thereby being energized by the motor voltage. Thus, according to the relation of the load and field currents required at any one speed of the traction motor to maintain a predetermined voltage, as determined by the setting of the rheostat VR, the exciter E will correct the field strength of the motors T1 and T2. By a suitable choice of field winding the amount of current flowing through the exciter armature may be held within certain limits, this current being a relatively small percentage of the total braking current. Thus, the size of the exciter is greatly reduced as compared with that required for supplying the full excitation of the traction motor fields.

It is obvious that there will be a very wide variation in the current flowing through the exciter armature between the steps of shunting the resistor R by means of resistor shunting switches R1, R2, R3 and R4. The exciter current preferably changes from an initial negative or by-passing value to a positive or boosting value as the traction motor armature current initially exceeds and later lacks the strength required by the motor fields to maintain the voltage as fixed by the reference field of the exciter.

The foregoing feature can be usefully utilized by causing a polarized relay A to be energized in part by the exciter armature current and in part by a steady supply in such a manner that when the exciter current reaches a predetermined maximum positive value the relay will cause a resistance shunting contactor to close, thereby effecting a corresponding increase in the braking current. This, in turn, will cause the exciter armature current to reverse, that is, it is forced to by-pass the excess braking current and the relay will then return to its normal position. Obviously, as the speed of the traction motors drops the same action is repeated. In this way the relay A automatically controls the braking resistance, shunting it step-by-step as the motor speed drops.

In Fig. 3, the curve a shows generally how the current in the exciter armature will vary as the sections of the resistor R are shunted from the braking circuit. As shown, the exciter current is at first in the negative direction, falling to zero and then building up to a positive value. At a certain positive value the relay A operates to shunt a section of the resistor R and the exciter current changes to a negative value. The current again becomes zero and increases to a positive value, and the same sequence of events occurs. The curve b shows generally how the braking current increases as the speed of the motors decreases. It will be noted that the tops or "riser" points of the curve b lie on a curve c.

As shown, the relay A is provided with a series winding A1 which is connected in series-circuit relation with the armature of the exciter E. The relay is also provided with a polarizing winding A2 which is energized from a substantially constant voltage source. The relay is so constructed that it is actuated to close its contact members when the current in the exciter armature reaches a certain positive value. It will be understood that the relay may be polarized by means of a permanent magnet instead of the coil A2, if desired.

When the contact members of the relay A are closed, a circuit is established from positive through a contact segment 11 of a braking controller BC, conductor 12 and the contact members of the relay A to the actuating coils of a pair of control relays X and Y. The circuit for the coil of the relay X is completed through contact member Y1, conductor 13, an interlock R11, and the actuating coil of switch R1 to negative. This causes the relay X and the switch R1 to operate, thereby shunting a section of resistor R. A holding circuit for the relay X is established through contact members X1 of the relay. A holding circuit for the switch R1 is established through an interlock R12 prior to the opening of the interlock R11, on the switch R1.

Nothing further can happen until the contact members of the relay A are opened because of the exciter armature current falling to zero and reversing. When the contact members of the relay A are opened, the relay X will return to its normal position.

When the current in the exciter armature again reaches a certain positive value, the relay A will close its contact members and complete a circuit for the coils of the relay Y and the switch R2 through contact members X2, conductor 14, an interlock R21, conductor 15, an interlock R13 and the actuating coil of the switch R2 to negative. The closing of the switch R2 shunts another section of the resistor R from the dynamic braking circuit. A holding circuit for the relay Y is established through contact members Y2 of the relay. A holding circuit for the switch R2 is established through an interlock R22 which connects the coil of the switch R2 to the retaining wire 12.

As the exciter armature current again decreases, the contact members to the relay A are opened, thereby causing the relay Y to return to its normal position. When the exciter armature current has built up to a predetermined positive value, the relay A is reclosed, thereby causing the actuating coil of the switch R3 to be energized through a circuit which extends from the conductor 12 through the contact members of the relay A, the coil of the relay X, contact members Y1, an interlock R31, conductor 16, an interlock R23, and the coil of the switch R3 to negative. The closing of the switch R3 shunts another section of resistor R from the dynamic braking circuit. A holding circuit for the relay X is established through the contact members X1 and a holding circuit for the switch R3 is established through an interlock R32.

When the contact members of the relay A are opened, the relay X is deenergized and nothing further will happen until the current in the exciter armature is again built up to a predetermined positive value. The relay A will then close its contact members, thereby causing the relay Y to operate and also establishing a circuit for the coil of the switch R4, which extends from the conductor 12, through the contact members of A, the coil of Y, contact member X2, the conductor 14, an interlock R41, conductor 17, an interlock R33 and the coil of the switch R4 to negative. A holding circuit for the relay Y is established through its contact members Y2 and a holding circuit for the switch R4 is established through an interlock R42.

In this manner, the resistor R is shunted step-by-step as the speed of the motor decreases. As shown by the curves in Fig. 3, the excitation current in the traction motor fields is such that the motor armature current increases as the motor speed decreases, thereby improving the commutation conditions on the motors, as hereinbefore explained. As shown by the curve c the motor current follows substantially the line of a hyperbola. It will be understood that the number of resistor shunting switches may be increased to provide any desired number of resistor shunting steps.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a control system, in combination, a motor having a series field winding, a dynamic braking circuit for the motor, resistance means connected in said braking circuit, control means for varying said resistance means, an exciter having an armature winding connected in parallel-circuit relation to the series field winding of the motor, said exciter having a control field winding energized by the motor and a separately excited reference field winding, and relay means responsive to the armature current of the exciter for controlling the operation of said control means.

2. In a control system, in combination, a motor having a series field winding, a dynamic braking circuit for the motor, resistance means connected in said braking circuit, control means for varying said resistance means, an exciter having an armature winding connected in parallel-circuit relation to the series field winding of the motor, said exciter having a control field winding energized by the motor and a separately excited reference field winding, and polarized relay means responsive to the armature current of the exciter for controlling the operation of said control means.

3. In a control system, in combination, a motor having a series field winding, a dynamic braking circuit for the motor, resistance means connected in said braking circuit, control means for varying said resistance means, an exciter having an armature winding connected in parallel-circuit relation to the series field winding of the motor, excitation means for the exciter energized by the motor, and relay means energized by the exciter for controlling the operation of said control means.

4. In a control system, in combination, a motor having a series field winding, a dynamic braking circuit for the motor, resistance means connected in said braking circuit, control means for varying said resistance means, an exciter having an armature winding connected in parallel-circuit relation to the series field winding of the motor, excitation means for the exciter energized by the motor, and relay means responsive to the armature current of the exciter for controlling the operation of said control means.

5. In a control system, in combination, a motor having a series of field winding, a dynamic braking circuit for the motor, resistance means connected in said braking circuit, control means for varying said resistance means, an exciter having an armature winding connected in parallel-circuit relation to the series field winding of the motor, adjustable excitation means for the reciter, additional excitation means for the exciter energized by the motor, and relay means energized by the exciter for controlling the operation of said control means.

6. In a control system, in combination, a motor having a series field winding, a dynamic braking circuit for the motor, resistance means connected in said braking circuit, control means for varying said resistance means, an exciter having an armature winding connected in parallel-circuit relation to the series field winding of the motor, adjustable excitation means for the exciter, additional excitation means for the exciter energized by the motor, and polarized relay means responsive to the armature current of the exciter for controlling the operation of said control means.

7. In a control system, in combination, a motor having a series field winding, a dynamic braking circuit for the motor, a resistor connected in said braking circuit, switching means for shunting said resistor step-by-step, an exciter having an armature winding connected in parallel-circuit relation to the series field winding of the motor, variable excitation means for the exciter, and relay means energized by the exciter for controlling the operation of said switching means.

8. In a control system, in combination, a motor having a series field winding, a dynamic braking circuit for the motor, a resistor connected in said braking circuit, switching means for shunting said resistor step-by-step, an exciter having an armature winding connected in parallel-circuit relation to the series field winding of the motor, variable excitation means for the exciter, and polarized relay means energized by the armature current of the exciter for controlling the operation of said switching means.

9. In a control system, in combination, a motor having a series field winding, a dynamic braking circuit for the motor, a resistor connected in said braking circuit, switching means for shunting said resistor step-by-step, an exciter having an armature winding connected in parallel-circuit relation to the series field winding of the motor, variable excitation means for the exciter, control relays for controlling the operation of said switching means, and a relay energized by the exciter for controlling the energization of said control relays.

10. In a control system, in combination, a motor having a series field winding, a dynamic braking circuit for the motor, a resistor connected in said braking circuit, switching means for shunting said resistor step-by-step, an exciter having an armature winding connected in parallel-circuit relation to the series field winding of the motor, variable excitation means for the exciter, a pair of alternately energized control relays for controlling the operation of said switching means, and a polarized relay energized by the armature current of the exciter for controlling the energization of said control relays.

ERIC ALTON BINNEY.
FREDERICK WALTER ROBERTS.

No references cited.